Patented May 8, 1951

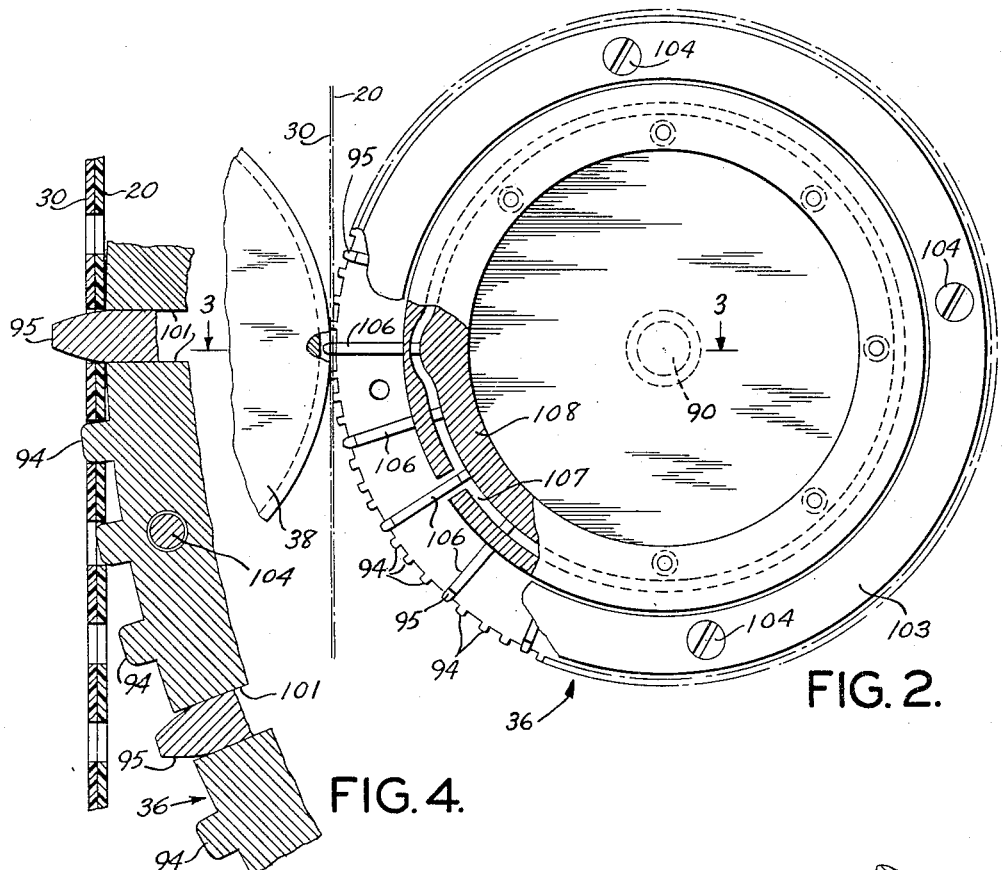
FIG. 2.
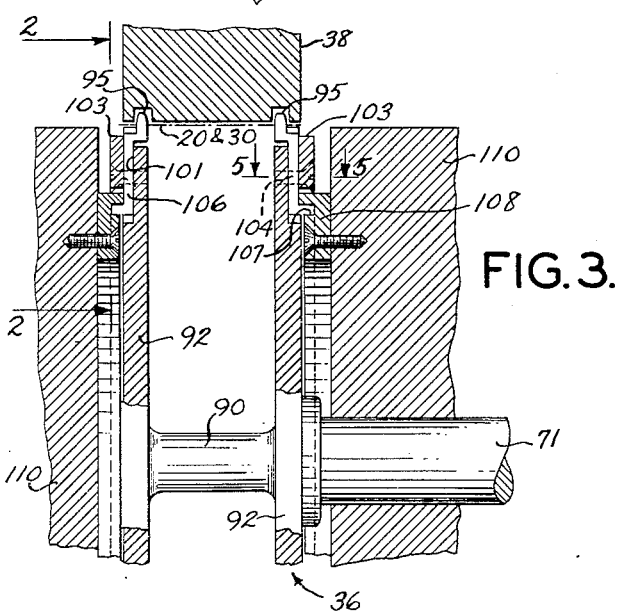
FIG. 4.
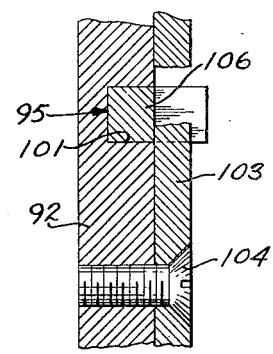
FIG. 3.
FIG. 5.

2,551,689

UNITED STATES PATENT OFFICE 2,551,689

APPARATUS FOR STRIPPING AND PRINTING MOTION-PICTURE FILMS WITH IMPROVED REGISTRATION

Arthur J. Miller, Teaneck, N. J.

Application February 18, 1949, Serial No. 77,134

11 Claims. (Cl. 41—1)

This invention relates to apparatus for obtaining more accurate registration of corresponding frame areas when printing motion picture films, or when stripping a color separation layer from a multi-emulsion film. The invention is particularly applicable to imbibition printing in which the superimposed films must be held in contact for a substantial period while the dye is imbibed, and for stripping a color separation layer which also involves a substantial period of time to obtain softening of the bond between the color separation layer and the negative from which it is to be stripped and affixed to another film.

It is an object of this invention to provide an improved apparatus for bringing the corresponding frame areas of the superimposed films into accurate registration; and it is another object of the invention to maintain the accurate registration while the films move beyond the station at which the original registration was imposed.

The films are preferably of the same length between sprocket openings at the time of registration, and feature of the invention relates to the treating of one film so as to make its length between sprocket openings correspond with the length of the other film with which it is to be brought into contact for the printing or stripping operation. Ordinarily the film frame lengths of a processed film, such as a developed negative film strip, are shorter than the frame areas of a strip of raw film stock. Even a small difference in the spacings of the sprocket openings of two films is objectionable when attempting to obtain accurate registration because the differences in sprocket opening spacings are accumulative.

With this invention, the film having the shorter spacings between sprocket tooth openings is passed through a bath, which may be water, with the temperature coordinated with the rate of travel so that the length of the film will increase and cause the spacings between the openings to correspond with those of the other film.

Another object of the invention is to bring successive film frame areas into accurate registration without passing the superimposed films around any abrupt turns at either the registration station or immediately beyond the registration station. Passage of the film into or out of an abrupt turn causes some creeping of one film across the other because of the difference in the radius of curvature of the two film strips. This invention passes the films across a sprocket having registration pins or teeth that are retractable, and that are projected into the sprocket openings with the films substantially tangent to the sprocket and with both of the films in immediate contact with one another beyond the sprocket and along a substantial run which is free of abrupt turns.

The sprocket used for this invention, with retractable teeth, is claimed in my copending application Serial No. 1,152, filed January 8, 1948.

Other objects, features and advantages of the invention will appear or be pointed out as the description proceeds.

In the drawing, forming a part hereof, in which like reference characters indicate corresponding parts in all the views.

Figure 2 is an enlarged view, partly broken away and in section, of the guide means and registration pins at the registration station of Figure 1, the section being taken along the line 2—2 of Figure 3.

Figure 3 is an enlarged sectional view taken on the line 3—3 of Figure 2.

Figure 4 is a greatly enlarged sectional view showing the operation of the sprocket in producing registration of the film strips.

Figure 5 is a greatly enlarged sectional view taken on the line 5—5 of Figure 3.

Figure 1:
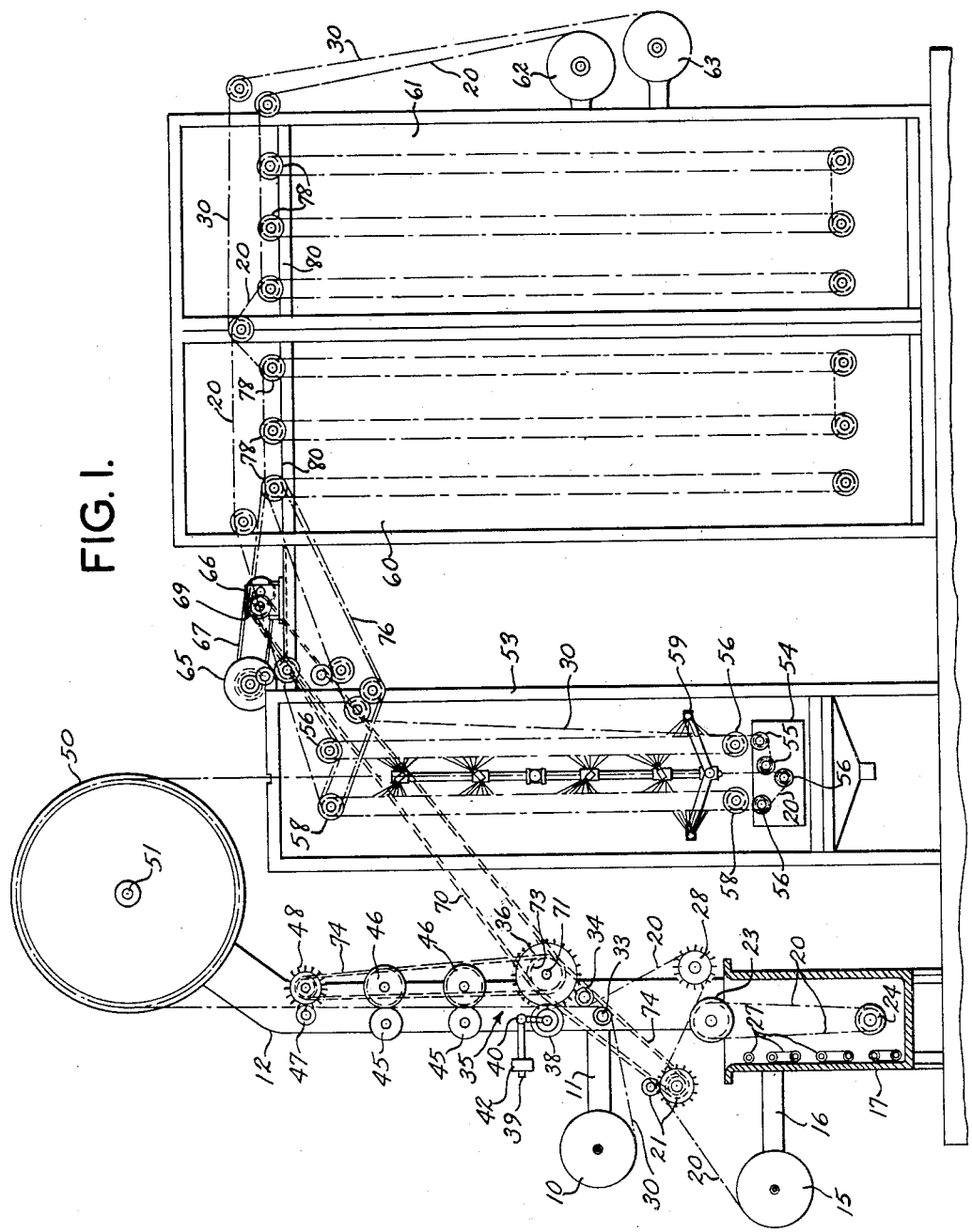
Figure 1 is a diagrammatic assembly view of apparatus for stripping or printing motion picture film in accordance with this invention.

The apparatus shown in Figure 1 includes a reel 10 that holds an unprocessed film to which one of the color separation emulsions of the negative is to be transferred. This reel is supported by a bracket 11 from a main frame 12 of the apparatus. On another reel 15 there is wound a negative film having different color separation emulsions bonded to it.

The reel 15 is supported by a bracket 16 from a tank 17 which is connected with the main frame 12. The film or film strip 20 from the reel 15 passes between feed rolls 21, one of which has sprocket teeth which engage with sprocket tooth openings in the film strip 20. From the feed rolls 21, the film 20 passes around idler rolls 23 and 24 at the upper and lower portions of the tank 17. There may be a plurality of coaxial rolls 23 at the top of the tank and corresponding coaxial rolls 24 at the bottom of the tank for obtaining a number of loops of the film 20 in the tank 17. This is a well known expedient in the motion picture art for keeping the film immersed for a substantial period even though it is traveling at a relatively rapid linear speed.

The tank 17 contains liquid that will soften the bond between the outside color separation emulsion of the film 20 and the next underlying emulsion. Passing through the liquid in the tank 17 causes the film 20 to soften and stretch slightly so that the spacings of its sprocket openings correspond with those of the film from the reel 10. The effectiveness of the liquid in the tank 17 depends not only upon the length of time that the film is in the liquid, but also upon the temperature of the liquid. Since the speed of travel of the film is determined, at least to some extent, by the available distance between the registration station and the apparatus at which the films are moved out of contact with one another beyond the registration station, the tank 17 is equipped with coils 23 for controlling the temperature of the liquid in the tank. This temperature is coordinated with the speed of film travel so as to obtain the desired increase in film length.

After passing beyond the last roll 24, the film 20 travels around a sprocket 28, and the deflected run of the film around the sprocket 28 can be kept under some tension as an aid in stretching the softened film to the same inter-sprocket opening length as the film 20.

The unprocessed film 30 from the reel 10 passes around a guide roll 33 and then upward to a registration station which is indicated generally by reference character 35. The negative film 20 passes around a guide roll 34 which brings the films 20 and 30 into contact with one another immediately below the registration station 35.

At the registration station 35 there is a sprocket 36 with teeth for engaging the sprocket openings in the superimposed films 20 and 30; and the films are held against the sprocket 36 by a roll 38 supported by a bell crank 39 which rocks about a pivot 40 extending from the main frame 12. In order to obtain a uniform pressure between the roll 38 and the films 20 and 30, a weight 42 is placed on the horizontally extending arm of the bell crank 39. This weight can be adjusted toward and from the pivot 40 to control the pressure exerted by the roll 38.

There are successive pairs of guide rolls 45 and 46 beyond the registration station 35. These guide rolls 45 and 46 maintain the run of the films substantially straight and tangent to the sprocket 36, and supply a wringing action to press the films tightly into contact as the films move beyond the registration station. Feed rolls 47 and 48 pull the films 20 and 30 through the successive passes between the guide rolls 45 and 46. The roll 48 has teeth for engaging the sprocket openings in the films.

The sprocket or toothed roller 48 imparts a constant tension to the films. This result can be attained by driving the sprocket 48 through a friction clutch, but preferably by mounting the sprocket 48 on a slide movable in the direction of the films and provided with a counter weight and pulley arrangement to assure the constant tension. Since sprocket 48 is driven by a chain, enough slack and a spring loaded idler will drive regardless of slight variations in the length of film between the registration station and this sprocket.

Beyond the feed rolls 47 and 48, the films 20 and 30 pass around a large wheel 50 supported by axle 51 from the main frame 12. The radius of the wheel 50 is so large in proportion to the thickness of the film 20 that the percentage difference in the radii of curvature of the films 20 and 30, when passing over the wheel 50, is so small that it does not cause the films to creep with respect to one another. The travel of the films 20 and 30 around the wheel 50 is not an "abrupt" turn, and the only purpose of the wheel 50 is to locate the different parts of the apparatus in more convenient relation to one another and to cut down the space needed for the apparatus.

The superimposed films 20 and 30 travel downward from the wheel 50 into a frame 53 that holds a tank 54 in which the films are separated from one another. The films 30 travels around rolls 55 and toward the right hand end of the tank 54 whereas the other film 20 travels around rolls 56 and toward the left hand end of the tank 54. The tank 54 is filled with water to a level above the region at which the films 20 and 30 move out of contact with one another. The actual stripping of the emulsion is thus carried on under water.

Within the frame 53, the separate films 30 and 20 travel up and down around rolls 56 and 58, respectively; and pass adjacent to spray nozzles 59 from which water is projected to wash the films.

The distance that the films 20 and 30 travel from the registration station 35 to the stripping tank 54 is coordinated with the speed at which the feed rolls are driven so as to allow time for the color separation emulsion bond to soften and for the emulsion to adhere firmly to the film 30 to which it is being transferred.

The films 20 and 30 pass from the guide rolls in the frame 53 to other guide rolls in dryers 60 and 61, the film 20 being dried in the dryer 61 and the film 30 being dried in the dryer 60. Beyond the dryers, the films 20 and 30 are wrapped around reels 62 and 63 respectively. These reels are driven by any conventional wind-up mechanism, the illustration of which is not necessary for the complete understanding of this invention.

In order to obtain accurate control and coordination of the speed of all of the feed rolls, power is preferably supplied to all driven rolls from a common motor. In the illustrated construction, an electric motor 65 drives a speed reducer 66 through a belt 67. A sprocket 69 at the low speed end of the speed reducer 66 drives a chain 70 through which power is transmitted to a shaft 71. The sprocket 36 is secured to the shaft 71, and there are other sprockets 73 also secured to the shaft for driving chains 74 through which power is transmitted to the feed rolls 21, 47 and 48.

The speed reducer 66 also drives a chain 76 which rotates the rolls 56 in the upper portion of the frame 53, and also rotates rolls 78 in the dryers 58 and 59, the left hand roll 78 being driven directly from the chain 76, and the other roll 78 being connected together by short chains 80 extending between sprockets on the ends of the shafts to which these rolls 78 are secured.

The apparatus shown in Figure 1 can also be used for imbibition color printing where accurate registration and the maintaining of such registration is highly important. When used for imbibition printing, the matrix is wrapped around the reel 15 and is advanced exactly the same way as the film strip 30, but the tank 17 is filled with a liquid dye instead of the emulsion bond solvent employed when the apparatus is used for stripping.

The apparatus is also suitable for making black and white prints, but the maintaining of accurate registration is not necessary after the films for such prints pass an exposure station located at the registration station 35. When making black and white prints, the negative film is wound on the reel 15 and the tank 17 is filled with water. By passing the negative through water at a controlled temperature, the negative can be made to stretch so that the spacings of its sprocket openings correspond with those of the raw film stock wound on the reel 10.

The registration station 35 with the film guide means, for maintaining the superimposed film strips substantially tangent to the sprocket 36 from which the registration teeth are projected, can be used without the tank 17 if the film strips are originally of equal length between sprocket openings. Unprocessed film strips can be shrunk under proper conditions to correspond in sprocket opening spacing with films that have been processed. When a particular negative is to be printed, a gage can be used to measure the spacing of its sprocket openings, and unprocessed film for printing or stripping can be gaged and selected for its equal sprocket opening spacing. The feature of this invention by which one film is treated to bring its length to that of the other film has the important advantage, however, that it permits the invention to be used with any stock which happens to be available and does not require as much inventory.

In the event that the original films are of the same length, and one of the films has to be passed through a die or solvent in the tank 17, a water bath can be provided for the film 30 so as to maintain the spacings of the sprocket openings equal. In rare instances where the raw film stock has shrunk to such an extent that its sprocket opening spacings are less than those of the processed film with which it is to be used, the unprocessed film is subject to a greater expansion than the other film by passing it through a warm bath or by having enough loops of the film in the bath so that it is submerged for a greater length of time than the other film.

The construction of the sprocket 36 is shown in Figures 2 to 5. The sprocket comprises a hub 90 and a body portion that includes two parallel spaced flanges 92 that are preferably integral with the hub 90. Each of the flanges 92 has sprocket teeth around its periphery, and in the construction shown certain sprocket teeth 94 are integral with the flange 92, whereas other sprocket teeth 95 are movable in a radial direction. Every fourth tooth is a movable tooth in the structure illustrated.

Since standard motion picture film has four sprocket openings for each film frame area, the construction with every fourth tooth movable provides a movable sprocket tooth 95 for each film frame area. These movable sprocket teeth serve as registration pins for bringing the frame areas of the films 20 and 30 into accurate registration for printing or stripping.

Each of the movable teeth or pins 95 slides in a guide slot 101 in the adjacent flange 92 and the movable teeth or pins 95 are held in their guide slots by a retaining ring 103 that is attached to the flange 92 by screws 104. The lower end of each of the movable teeth or pins 95 has a downwardly extending projection 106 that is located radially inward from the flange 92, and that fits into a slot 107 of a cam 108.

There is a cam 108 on each side of the sprocket, and each cam 108 is rigidly secured to a stationary supporting structure 110. The movable teeth or pins 95 are preferably of rectangular section and the slots 101 are of substantially similar cross section and provide bearing surfaces in which the pins 95 are free to slide while being held against turning in the guide slots 101. The projection 106 at the lower end of each of the movable teeth or pins 95 serves as a cam follower and is preferably of circular cross section.

The cam slot 107 is circular around most of its extent and has its center of curvature on the axis of rotation of the sprocket. The cam slot 107 departs from its circular curvature throughout the relatively small length of its circumference immediately under the roll 38. By having the high part of the cam slot 107 of shorter effective length than the frame areas of the films, the movable teeth of the sprocket 36 impose registration on only one pair of superimposed frame areas at a time. This feature makes it possible to obtain accurate registration even though there are some slight differences in the spacing between the sprocket openings of the two films. When the apparatus is used for printing a positive film by exposure to light through a negative film, the exposure station can be located at any desired region between the registration station and the upper feed rolls 47 and 48.

Figure 4 shows the shape and operation of the movable teeth or pins 95, and illustrates also the way in which the films 20 and 30 are advanced by the integral sprocket teeth 94. The clearances around the sprocket teeth in the sprocket openings of the films are exaggerated in Figure 4 for clearer illustration.

It will be apparent from Figure 4 that the integral sprocket teeth 94 contact with the forward edges of the sprocket openings in the films 20 and 30 to advance the films in accordance with the rotation of the sprocket 36. These teeth 94 fit loosely in the sprocket openings and therefore do not maintain the film frame areas in register. The teeth 95 have tapered upper ends that fit loosely in the sprocket openings of the films while the positions of these movable teeth or pins 95 are under the control of the circular portion of the cam track 107.

As each pin 95 approaches the registration station, the pin is thrust radially outward into the position of the upper pin 95 in Figure 4, and when in this position, the pin 95 fits snugly in the sprocket openings of the films 20 and 30 and compels registration of the film frame areas at the region of tangency of the films 20 and 30 with the sprocket 36. As the pin 95 travels beyond the region of tangency, it is pulled inward again by the shape of the cam track 107.

It is a feature of the invention that the films 20 and 30 are substantially tangent to the sprocket 36, and it is another feature of the invention that the sprocket 36 imposes registration on only one film frame area at a time.

The preferred embodiments of the invention have been illustrated and described, but changes and modifications can be made and some features can be used alone or in different combinations without departing from the invention as defined in the claims.

What is claimed is:

1. Apparatus for treating motion picture film strips having sprocket openings, said apparatus comprising a device for treating a film strip to make its length between sprocket openings substantially equal to that of another film strip, guide means that bring the film strips into initial contact with one another, a registration station immediately beyond the region at which the film strips are brought into contact with one another, guiding means between which the two film strips pass at the registration station with the film strips in contact with one another and with at least one surface of the guiding means in contact with one of the film strips and movable with the film strip, retractable registration teeth in the surface of the guide means that moves with the film strip, mechanism that moves the retractable registration teeth selectively into and out of full engagement with sprocket openings of the film strips as successive portions of the film strip reach the registration station, said registration teeth being of a size to engage fully the sprocket openings of the film strips for compelling accurate registration of frame areas of the respective film strips, and other guide means for the film strips beyond the registration station with contact surfaces that guide the strips without affecting the registration imparted to the film strips by the retractable teeth.

2. Treating apparatus for motion picture films having corresponding rows of sprocket openings, said apparatus comprising a device for treating one film to make its length between sprocket openings substantially equal to that of the other film, guide means that bring the film strips into initial contact with one another, a station immediately beyond said guide means at which successive film frame areas of the respective films are brought into accurate registration, guiding means at the registration station including a sprocket that turns to advance the films, teeth on the sprocket angularly spaced around the periphery of the sprocket for engaging the sprocket openings of the films, at least some of said teeth being of a size to fit fully in the sprocket tooth openings, means that operate in timed relation with the revolutions of the sprocket for projecting and retracting the full fit teeth, and other guide means for the film strips beyond the registration station with contact surfaces that guide the strips without affecting the registration imparted to the film strips by the retractable teeth.

3. Apparatus for advancing superimposed motion picture film strips with respect to a registration station, said apparatus including a device that treats one film strip to make the length of its respective frame areas correspond to that of the other film strip, guide means that bring the film strips into initial contact with one another ahead of the registration station, a guiding means adjacent to the registration station, a sprocket associated with said guiding means, registration teeth angularly spaced around the periphery of the sprocket, said registration teeth being of a size to fit fully into the sprocket openings in the superimposed film strips, cam means that displace the registration teeth into and out of engagement with the film sprocket openings as the sprocket turns, said cam means having an effective displacement region shorter than the spacing of the registration teeth.

4. Apparatus for stripping or printing colored motion picture film strips having sprocket openings, said apparatus comprising a device through which the shorter of said film strips passes to increase its length between sprocket openings to that of the other film, guide means that bring the film strips into initial contact with one another, a registration station through which the film strips pass in superimposed relation to one another, a sprocket at the registration station, means through which driving power is supplied to the sprocket for advancing the film strips, said sprocket having teeth angularly spaced around its periphery for engaging the sprocket openings of the film strips, some of the sprocket teeth fitting freely into the sprocket openings and others of the sprocket teeth being of a size to fit fully into the sprocket openings and impose exact registration of successive film frame areas, mechanism that moves the full fit teeth radially in the sprocket into and out of full engagement with sprocket openings in the films as predetermined openings reach the registration station, and other guide means for the film strips beyond the registration station with contact surfaces that guide the strips without affecting the registration imparted to the film strips by the retractable teeth.

5. Stripping apparatus for color films, including in combination, a device for increasing the length of a raw film strip, from which a color separation layer is to be transferred, so that the spacing of sprocket openings in the raw film strip is equal to the spacing of corresponding sprocket openings of the other film, a tank of liquid through which said raw film strip passes to receive an immersion in a liquid that softens the bond of the color separation layer that is to be stripped, guide means that bring the film strips into initial contact with one another, a registration station immediately beyond the region at which the film strips are brought into contact with one another, apparatus for moving full fit registration pins into and out of the sprocket openings of successive film frame areas as said openings reach the registration station, guide means beyond the registration station along which the films pass without abrupt turns and without affecting the registration imparted to the films by the retractable pins, the length of the guide means being coordinated with the intended rate of travel of the films to allow time for softening of the bond of the color separation layer, a stripping tank that holds liquid through which the films pass, guide means that separate the films under the liquid in the stripping tank, and a dryer beyond stripping tank and through which the films pass as they come from the stripping tank.

6. In film treating apparatus of the class wherein a motion picture film is passed through a liquid tank to make the spacings of the sprocket openings equal to those of another film and in which feed rolls advance the film through a registration station, the feed rolls being driven by an adjustable speed drive and the liquid through which the film is passed having a temperature control device, the combination with said registration station guides that hold two film strips in superimposed relation with one another, retractable pins at the registration station, mechanism for moving registration pins into position to compel registration of successive superimposed film frame areas, one at a time, as said successive film frame areas pass a predetermined location at the registration station, said mechanism including an element that displaces each retractable pin into and out of registration producing position during a movement of the superimposed film strips that is substantially less than the length of a film frame area of said film strips.

7. In film treating apparatus of the class wherein a sprocket with film engaging teeth is retracted at a predetermined speed and the shorter of the film is pulled through a tank of liquid ahead of the sprocket to increase the film length and make the spacings of the sprocket openings correspond with those of the other film, and the temperature of the liquid in the tank is controlled in accordance with the speed of the sprocket, the combination in said sprocket of angularly spaced teeth in position to engage sprocket openings of the superimposed motion picture films, at least some of the sprocket teeth being of a cross section that fits fully into the sprocket openings for compelling registration of corresponding frame areas of the films, mechanism for projecting and retracting the teeth that fit fully into the sprocket openings, said mechanism including an element that displaces each retractable tooth into and out of registration producing position during a peripheral arc of movement of the sprocket substantially less than the length of a film frame area of said films.

8. In apparatus for stripping or imbibition printing of motion picture films having sprocket teeth openings, and in which one of the films is pulled through a liquid tank and both films are advanced at the same speed by feed rollers, the liquid tank having a temperature control device coordinated with the speed of the feed rolls for causing the film that passes through the tank to be increased in length until the spacings of its sprocket tooth openings are equal to those of the other film, and the film frame areas of the respective films are brought into superimposed relation with one another at a registration station, the combination with said registration station of a sprocket at the station, guide means ahead of and beyond the registration station in position to hold at least one of the films substantially tangent to the sprocket as the films move toward and beyond the sprocket, guide means holding the films against the sprocket, angularly spaced teeth around the periphery of the sprocket in position to engage with the sprocket tooth openings of the films, some of the sprocket teeth fitting freely into openings of the films and others of the sprocket teeth being of a cross section that fits fully into the openings to compel accurate registration of the corresponding film frame areas of the respective films, bearings located in the sprocket and in which the full fit teeth are radially movable to project and retract these teeth with respect to the film openings, and cam means associated with the movable teeth of the sprocket, said cam means having an effective displacement zone substantially less than the length of the individual frame areas of the film.

9. In film treating apparatus in which films having corresponding tooth openings are brought into superimposed relation with one another, and guides holding the superimposed strips substantially tangent to a sprocket that advances the superimposed film strips, the improvement that comprises teeth at angularly spaced locations around the periphery of the sprocket in position to engage the openings in the films, at least some of the sprocket teeth being of a cross section to fit fully the film openings to compel accurate registration of corresponding frame areas of the films, the full fit teeth being movable radially with respect to the sprocket, apparatus for advancing and retracting the teeth in timed relation with rotation of the sprocket, said apparatus including an element that displaces and retracts each retractable pin into registration producing position during a movement of the superimposed films that is substantially less than the length of a film frame area of said films, and guides ahead of and beyond the sprocket in position to hold at least one of the films substantially tangent to the sprocket and to hold both of the films in contact with one another after they pass beyond the sprocket without affecting the registration imparted to the films by the retractable teeth of the sprocket, the diameter of said sprocket being coordinated with the tooth spacing so that the next successive tooth of the sprocket enters a film opening before each tooth has withdrawn entirely from the preceding film opening that it engaged.

10. In stripping or imbibition printing apparatus of the class wherein motion picture films having sprocket tooth openings for treating, and one film is treated to change its length so that the spacings of its sprocket tooth openings correspond with the spacings of the sprocket openings of another film before the films are brought together in superimposed relation at a registration station, the combination with said registration station of a sprocket located at the registration station, teeth on the sprocket angularly spaced around the periphery of the sprocket, at least some of the teeth being of a cross section to fit fully into the sprocket tooth openings of the films for compelling exact registration of the corresponding frame areas of the respective films, mechanism for moving the full fit teeth with respect to the periphery of the sprocket to project the teeth into the film openings and to retract the teeth from the film openings, said mechanism including an element that displaces and retracts each full fitting tooth into and out of registration producing position during a movement of the superimposed films that is substantially less than the length of a film frame area of said films, guide means that hold at least one of the films substantially tangent to the sprocket and other guide means that hold both of the films in contact with one another beyond the sprocket without affecting the registration imparted to the films by the retractable teeth of the sprocket, said other guide means extending for a substantial distance beyond the sprocket without abrupt change in direction so that there is ample time for the softening of an emulsion band or the inbibing of dye before the superimposed films are required to make an abrupt turn in their direction of travel.

11. Film stripping apparatus for film strips that have sprocket openings, said apparatus comprising guide means that bring the film strips into initial contact with one another, a registration station immediately beyond the region at which the film strips are brought into contact with one another, a sprocket at the registration station with teeth, at least some of which are movable to project them into the sprocket openings and retract them from the sprocket openings in accordance with a predetermined cycle, the retractable teeth being of a cross section to fit fully in the sprocket openings of the film strips when the teeth are completely engaged with the sprocket openings, guide means holding the strips tangent to the sprocket, the diameter of said sprocket being coordinated with the tooth spacing of the sprocket so that the next successive tooth of the sprocket enters a film opening before each tooth has withdrawn entirely from the preceding film opening that it engaged.

ARTHUR J. MILLER.

REFERENCES CITED

The following references are of record in the file of this patent:

UNITED STATES PATENTS

| Number | Name | Date |
|---|---|---|
| 2,016,083 | Ensign et al. | Oct. 1, 1935 |
| 2,071,878 | Huc | Feb. 23, 1937 |
| 2,200,086 | Kellogg | May 7, 1940 |
| 2,415,442 | Rackett | Feb. 11, 1947 |
| 2,417,060 | Capstaff | Mar. 11, 1947 |

FOREIGN PATENTS

| Number | Country | Date |
|---|---|---|
| 89,630 | Austria | Jan. 15, 1922 |